(12) United States Patent
Baeuerle et al.

(10) Patent No.: US 6,688,104 B2
(45) Date of Patent: Feb. 10, 2004

(54) METHOD AND DEVICE FOR OPERATING AN ELECTRICAL SUPERCHARGER

(75) Inventors: Michael Baeuerle, Ditzingen-Heimerdingen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/205,988

(22) Filed: Jul. 26, 2002

(65) Prior Publication Data

US 2003/0019212 A1 Jan. 30, 2003

(30) Foreign Application Priority Data

Jul. 28, 2001 (DE) .......................... 101 36 977

(51) Int. Cl.⁷ .................... F02B 33/44; F02B 37/04
(52) U.S. Cl. ................ 60/608; 123/520; 123/198 D
(58) Field of Search ................ 60/607, 608; 123/520, 123/198 D, 198 F

(56) References Cited

U.S. PATENT DOCUMENTS

| | | | | |
|---|---|---|---|---|
| 4,958,497 A | * | 9/1990 | Kawamura .................. | 60/608 |
| 5,678,407 A | * | 10/1997 | Hara ........................... | 60/608 |
| 5,996,552 A | * | 12/1999 | Iijima et al. ........... | 123/339.18 |
| 6,029,452 A | | 2/2000 | Halimi et al. ................ | 60/608 |
| 6,062,026 A | * | 5/2000 | Woollenweber et al. ...... | 60/612 |
| 6,182,449 B1 | * | 2/2001 | Halimi et al. ................ | 60/608 |

FOREIGN PATENT DOCUMENTS

| | | |
|---|---|---|
| DE | 43 12 720 | 10/1994 |
| DE | 198 09 384 | 9/1999 |

* cited by examiner

*Primary Examiner*—Sheldon J. Richter
(74) *Attorney, Agent, or Firm*—Kenyon & Kenyon

(57) ABSTRACT

In a method and a device for operating an electrical supercharger, the electrical supercharger is actuated for cooling and/or diagnostic purposes in the non-combustion operation of the internal combustion engine.

21 Claims, 2 Drawing Sheets

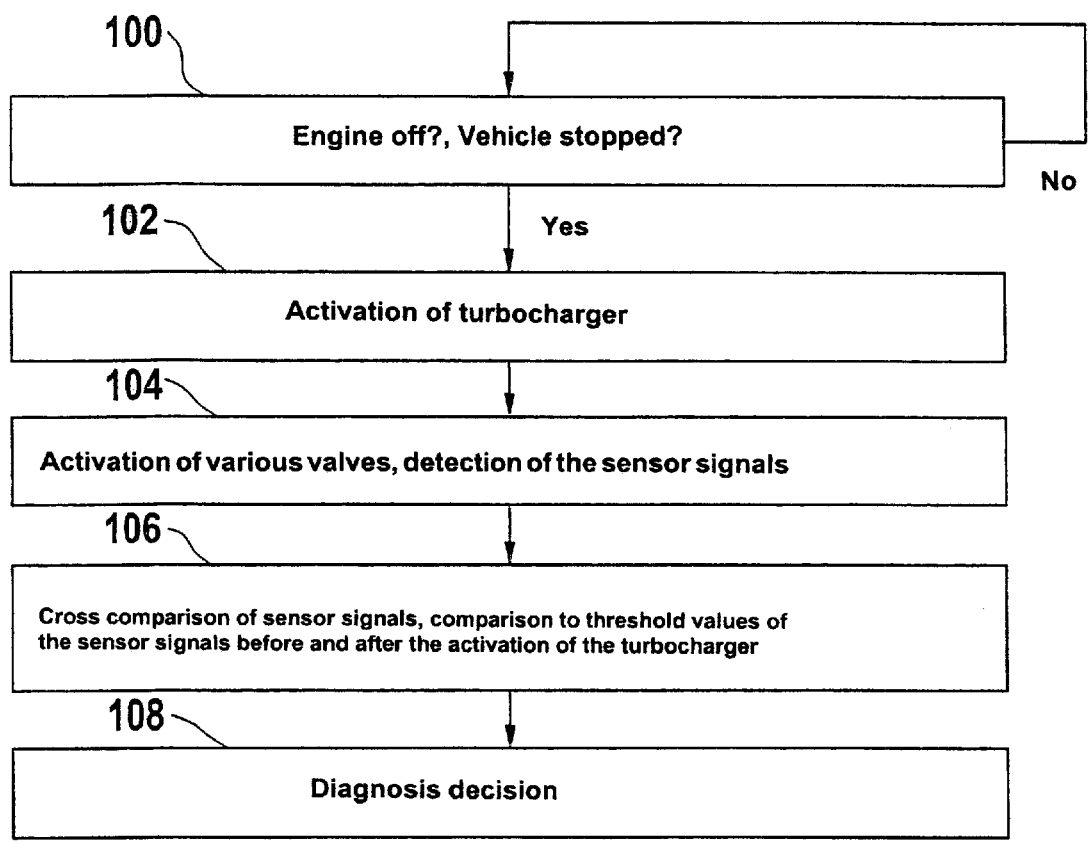

METHOD AND DEVICE FOR OPERATING AN ELECTRICAL SUPERCHARGER

FIELD OF THE INVENTION

The present invention relates to a method and a device for operating an electrical supercharger, at least one component connected to the intake manifold of an internal combustion engine being diagnosed on the basis of the operation of the electrical supercharger.

BACKGROUND INFORMATION

Enhancing the performance of an internal combustion engine by compressing the air necessary for combustion of the fuel using an exhaust turbocharger, which includes a turbine and a compressor operated in the air supply to the internal combustion engine, is conventional. Supporting the exhaust turbocharger using an auxiliary electrical drive to improve the response behavior of the exhaust turbocharger is conventional. This may, for example, be achieved via an electric motor, integrated in the exhaust turbocharger, which drives the shaft of the exhaust turbocharger supportingly at low speeds of the internal combustion engine. For example, operating an electrically-operated charge air compressor, which is also referred to as an electrically operated auxiliary supercharger (EL), in series with a conventional exhaust turbocharger in the air supply of the internal combustion engine is described in U.S. Pat. No. 6,029,452.

A method for testing the reliability performance of a fuel tank venting system, in which, during operation of the internal combustion engine, the fuel tank venting valve is closed and the fuel tank shutoff valve is opened for monitoring purposes during supercharger operation is described in German Published Patent Application No. 43 12 720. The reliable performance of the fuel tank venting system is determined using the overpressure which builds up in the fuel tank.

Other methods for diagnosing a fuel tank venting system use additional pressure sources, with the aid of which tightness tests of the fuel tank venting system are performed (for example, German Published Patent Application No. 198 09 384).

SUMMARY

By activating the electrically operated supercharger after the vehicle is stopped, a further operating range for the engine control system is opened, in which functions are performed which relate to an air flow in the intake manifold and/or in the exhaust system of the vehicle. The flexibility of an engine control system, e.g., in the diagnostic area, may be significantly enhanced in this manner.

The electrically operated supercharger may be activated after the engine is turned off to cool the engine using the air flow guided through the engine and/or to cool the catalytic converter(s) in the exhaust system, which are cooled down by the flow of fresh air generated by the electrically operated supercharger.

Advantages may result in the diagnostic area through the operation of the electrically operated supercharger after the engine is turned off. In this case, various components connected to the intake manifold and/or the exhaust system may be diagnosed when stopped, with the engine turned off. At the same time, diagnostic methods may also be used which may require a pressure or an air flow in the intake or exhaust system. Operation of the engine may therefore not be necessary, which saves computer time, memory space, etc.

In this manner, optimized diagnostic methods for components connected to the intake manifold and/or exhaust system are made possible.

A more exact diagnosis may be possible than using diagnosis during driving, since well-defined environmental conditions exist when the engine is turned off.

Furthermore, in some cases components may be dispensed with, for example, the overpressure pump for diagnosing the fuel tank venting system.

By operating the electric supercharger after the engine is turned off, diagnosis of the fuel tank venting system of an internal combustion engine may be made possible, e.g., leak detection in the fuel tank venting system, testing the function of the fuel tank venting valve and shutoff valve (tightness tests), diagnosis of exhaust recirculation and/or circulating air valves, tightness testing of throttle valve, idle speed control, and (in diesel engines) exhaust valve, diagnosis of air flow sensor and intake manifold pressure sensor, and/or diagnosis of the turbo blower, of lambda probes, and various temperature probes such as exhaust temperature sensor, intake temperature sensor, etc.

A well-defined valve overlap (intake/outlet valve) may be performed to improve the flow rate to the exhaust system by activating a crankshaft starter generator connected to the power train. This generator operates the internal combustion engine so that the settings of intake and outlet valves result in a well-defined valve overlap and therefore in opening a cross-section between the intake manifold system and the exhaust system.

BRIEF DESCRIPTION OF THE DRAWINGS

FIG. 2 illustrates an exemplary method for diagnosing at least one component connected to the intake manifold system or the exhaust system with reference to a flow diagram.

DETAILED DESCRIPTION

Figure 1:
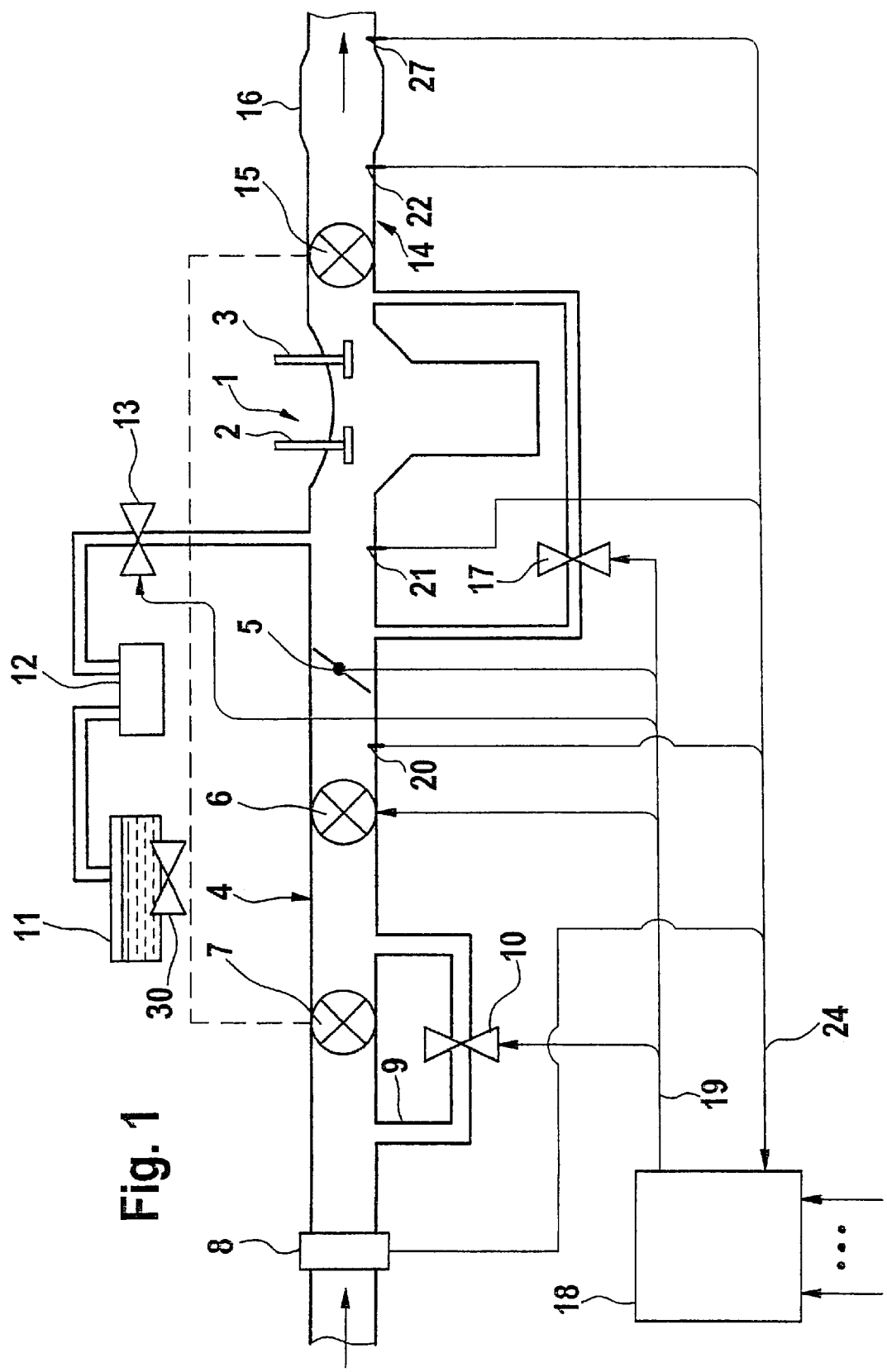
FIG. 1 illustrates an exemplary embodiment of an internal combustion engine having components shown as examples.

FIG. 1 is a schematic overview of an internal combustion engine having intake system and exhaust system as well as selected components, which are mentioned in the framework of the method described in the following. Internal combustion engine 1 has intake valve 2 and outlet valve 3. A throttle valve 5, which may also be electrically actuated, an electric supercharger 6, and compressor 7 of an exhaust turbocharger are positioned in intake system 4 of the internal combustion engine. Furthermore, an air flow sensor 8 is provided which detects the flow rate of the intake air. A circulating air valve 10 is positioned in a bypass channel 9 of compressor 7. Furthermore, the supply line of the fuel tank venting system, which essentially includes tank 11, activated carbon filter 12, an electrically actuatable fuel tank venting valve 13, and a fuel tank shutoff valve 30, discharges into the intake manifold downstream from the throttle valve. Turbine 15 of the exhaust turbocharger, which is mechanically connected to the compressor, as well as at least one catalytic converter 16, are located in exhaust system 14 of the internal combustion engine. Furthermore, an exhaust recirculation line from the exhaust system is connected to the intake manifold downstream from throttle valve 5 via an exhaust recirculation valve 17. An electronic control unit 18 actuates the electrically actuatable valves and actuators, such as electrical supercharger 6, circulating air valve 10, fuel tank venting valve 13, exhaust recirculation valve 17, etc., via output lines 19. Depending on how the internal combustion engine is equipped, there are further actuators connected to the intake manifold system and/or exhaust system and the systems linked to them. For example, throttle valve 5 is electrically actuatable or throttle valve 5 is bypassed using a bypass line in which an electrically actuatable bypass valve is provided. Furthermore, the fuel tank venting system is equipped with a shutoff valve (activated carbon shutoff valve), which blocks the venting line of the fuel tank. In diesel engines, exhaust valves are provided which, controlled by electrical control unit 18, at least partially reduce the cross-section of the exhaust system. Depending on how the internal combustion engine is equipped, these elements are used in any desired combination.

Operating variables in the region of the intake and/or exhaust system are measured using sensors. Selected sensors are illustrated in FIG. 1: an air flow sensor 8, a boost pressure sensor 20, an intake manifold pressure sensor 21, an exhaust temperature sensor 22, and a lambda probe 27. Their sensor signals are sent from input lines 24 to control unit 18, which analyzes the sensor signals in the framework of the programs stored in its microcomputer and generates adjustment signals for the various valves and actuators of the internal combustion engine. In other exemplary embodiments, further sensors are provided which are used to control the internal combustion engine, one or more of the sensors illustrated in FIG. 1, for example, the air flow sensor, being left out in some exemplary embodiments.

By using an electrically operatable supercharger 6, it is possible to generate an air flow in the intake system and/or—when the intake and outlet valves are open—even in the exhaust system and/or to build up an overpressure in the intake system independently of the operating state of the internal combustion engine.

This ability is used for cooling the engine or components and/or for diagnostic purposes.

After the engine is turned off when the vehicle is stopped, an activation signal for electrically operated supercharger 6 is therefore generated by electronic control unit 18 for a predetermined time, for example. This supercharger blows air from the intake system to the exhaust system via the intake and outlet valves and in this manner cools the internal combustion engine and its components and/or the catalytic converter. In the exemplary embodiment, the supercharger is activated using a control signal of a predetermined magnitude, which results in a predetermined speed and therefore in a predetermined air flow and/or a predetermined pressure in the intake system. In order to improve the flow through the cylinders of the internal combustion engine and the exhaust system, the internal combustion engine is moved, using an electric motor, e.g., a crankshaft starter generator, into a position in which a well-defined opening of intake and outlet valve results which allows an optimum flow rate. Opening the electrically actuatable throttle valve is also provided in this case. Another application time is non-combustion driving, e.g., coastdown operation.

The activation of the electrically operated supercharger occurs when the motor has been turned off and may be when the vehicle is stopped, so that no unintended operating situations are triggered by air flow and/or overpressure which are not desired by the driver and are possibly not reproducible. Shutdown of the engine may be determined in this case on the basis of the ignition switch signal and/or the rotational speed signal of the internal combustion engine, and the stopped vehicle may be determined on the basis of vehicle speed or wheel speed signals. If the engine is turned off and the vehicle is stopped, electrically operated supercharger 6 is actuated as described above.

The ability to influence the air and/or pressure ratios in the intake system and/or exhaust system even when the engine is stopped, i.e., turned off, allows improved, more exact diagnosis of components which work together with the intake system and/or the exhaust system, e.g., in regard to their function and/or tightness.

An exemplary application of a diagnosis of a component of the internal combustion engine based on switching on the electrically operated supercharger after the engine has been turned off is the diagnosis of the fuel tank venting system. After actuating the supercharger using a pre-selected activation signal variable, overpressure arises in the intake manifold system, which propagates further into the fuel tank in the event fuel tank venting valve 13 is open, and possibly in the event a bypass valve of a return valve is activated and a shutoff valve is activated (closed). Using an intake manifold pressure sensor, boost pressure sensor, and/or fuel tank pressure sensor, this pressure increase is detected. In the event of corresponding overpressure in the fuel tank or in the intake manifold, the fuel tank venting valve and, if it is present, the shutoff valve, are closed. The pressure drop then measured is used as a value for the tightness of the fuel tank venting system. If the duration of the pressure drop of the tank pressure is too small, i.e., the pressure drops too quickly, a leak may be assumed, while a tight system may be assumed for a duration which exceeds a pre-selected threshold value. If no fuel tank pressure sensor is used for the analysis, but rather intake manifold pressure sensor 21 or boost pressure sensor 20, tightness of the fuel tank venting system may be assumed in the event of a reversed behavior, specifically, more rapid reduction of the overpressure when the tank venting system is tight than in a leaky fuel tank venting system. On the other hand, the diagnosis may also be performed in this case with reference to the rate of pressure build-up, since, if the fuel tank venting valve is tight, pressure build-up occurs more rapidly than if the system is leaky, due to the smaller volume. As an alternative to the bypass valve, in one exemplary embodiment a switching valve is used which opens or closes a direct connection from the fuel tank to the intake manifold. If the valve is open, there is a direct connection from the intake manifold to the fuel tank. After the pressure build-up, the valve opens the connection again. When the fuel tank venting valve and shutoff valve are closed, the pressure drop is to be monitored for diagnosis.

The overpressure built up as illustrated by the supercharger after the engine has been shut off is, however, also used in one exemplary embodiment to diagnose the seal of the throttle valve and/or, if it is present, of the idle speed control in the bypass and/or of the idle state controller, which adjusts the throttle valve, and/or of an exhaust valve in the exhaust system and/or an electrically adjustable valve drive. For this purpose, overpressure is built up in the system and the appropriate throttle(s) and/or valves are subsequently closed. The tightness of the respective actuator(s) is determined with reference to the pressure drop (intake manifold pressure, boost pressure, exhaust pressure, etc.), the exhaust recirculation valve also being included if exhaust recirculation is provided. If the pressure drop is more rapid than a reference rate, the valve(s) diagnosed are leaky; otherwise they are tight.

A diagnosis of a single valve is provided in that the values for pressure build-up and/or pressure drop when the valve is open and closed are compared to one another or to selected reference dimensions and leakage of the valve is established in the event of unacceptable deviation between the dimensions. The settings of the other valves or actuators remain unchanged in this case.

A diagnosis of circulating air valve 10 or exhaust recirculation valve 17 occurs similarly, the diagnosis being based on the fact that when overpressure is built up, different pressure drops may occur when the valve is open and closed. By evaluating the respective pressure drops, information about the tightness of the corresponding valve is obtained. If the crankshaft position may be changed using a starter or crankshaft starter generator, the method may also be performed with various crankshaft positions and therefore valve overlaps.

Depending on how the internal combustion engine is equipped, pressure sensor 20 or the signal of intake manifold pressure sensor 21 or the air flow signal of the hot film air flow sensor is used as a measured variable to detect the pressure drop.

In an exemplary embodiment, not only actuators are diagnosed, but also sensors. A well-defined air flow occurs through the well-defined activation of electrically actuatable supercharger 6, which is detected by air flow sensor 8. To diagnose air flow sensor 8, its measurement signal is compared to pre-selected limit values. These limit values are derived from the air flow to be expected when the supercharger is actuated in the turned-off state of the engine for the pre-selected amount of actuation. An error in the air flow sensor is recognized if the measurement signal leaves this tolerance band while the electric supercharger is activated.

A corresponding method may also be implemented for lambda probe 27 and various temperature sensors in the intake manifold and/or in the exhaust system, for example exhaust temperature sensor 22. Due to the air flow flowing through the internal combustion engine when the supercharger is actuated, rapid cooling of the intake manifold and/or of the exhaust occurs, resulting in cooling of the corresponding components which is more rapid than the normal cooling curve, and therefore in more rapid reduction of the temperature signal. Therefore, if the change in the temperature signal is greater than a pre-selected reduction existing during typical cooling, correct functioning of the temperature sensor may be assumed; otherwise a defect may be assumed.

The method described for diagnosing at least one component connected to the intake system or the exhaust system is performed by a program of the microcomputer of electronic control unit 18. An example of such a program is illustrated in FIG. 2. The program is repeated cyclically.

In first step 100 it is checked whether the engine has been switched off and the vehicle is stopped. This step is repeated until the engine has been switched off and the vehicle is at a standstill. If the vehicle has been switched off and the vehicle is stopped, the electrically operated turbocharger is activated in accordance with step 102. Subsequently, in step 104, various valves are activated depending on the components to be diagnosed. For example, during the diagnosis of the fuel tank venting valve, this valve is opened. After a predetermined time has passed or when a specific overpressure has been reached, fuel tank venting valve 13 is closed. At the same time, the sensor signals available are input. In following step 106, the sensor signals are then, in the example of the diagnosis of the fuel tank venting valve, analyzed for whether the pressure drop has a pre-selected course representing the normal operating state. At the same time, the electrically actuatable supercharger is switched off in the case of the diagnosis of the fuel tank venting system. Subsequently, the diagnosis decision is made in accordance with step 108 and, in the case of fault, a fault entry and/or a fault lamp are activated.

In summary, it may be established that, after the engine has been shut down, the electric supercharger is actuated for a predetermined duration or until a specific overpressure or a specific air flow is achieved, at least one of these dimensions being dependent on the engine temperature and/or the catalytic converter temperature and/or the temperature of the exhaust system. Depending on the embodiment, only one of these variables or any desired OR-combination of these variables is checked.

What is claimed is:

1. A method of operating an electrical supercharger, comprising:

actuating the electrical supercharger by an electronic control unit using an activation signal; and generating by the electrical supercharger at least one of an air flow and an overpressure in at least one of an intake system and an exhaust system of the internal combustion engine;

wherein the electrical supercharger is actuated in a non-combustion operation of the internal combustion engine, and the electrical supercharger is actuated during a coastdown operation of a vehicle.

2. A method of operating an electrical supercharger, comprising:

actuating the electrical supercharger by an electronic control unit using an activation signal; and generating by the electrical supercharger at least one of an air flow and an overpressure in at least one of an intake system of an internal combustion engine and an exhaust system of the internal combustion engine;

wherein the electrical supercharger is actuated in a non-combustion operation of the internal combustion engine, and the electrical supercharger is actuated after the internal combustion engine has been switched off.

3. The method according to claim 2, wherein the electrical supercharger is actuated while a vehicle is stopped.

4. The method according to claim 2, further comprising:

checking a measurement signal detection for reliable performance by checking at least one measurement signal variable of at least one sensor during actuation of the electrical supercharger, the at least one sensor configured to detect at least one of a temperature in a region of the intake system, a temperature in a region of the exhaust system, the air flow in the intake system, and a pressure in the intake system.

5. The method according to claim 2, further comprising:

determining a reliable performance of the electrical supercharger from a sensor signal from a sensor connected to at least one of the intake system and the exhaust system one of before the supercharger is actuated and after the supercharger is actuated.

6. A method of operating an electrical supercharger, comprising:

actuating the electrical supercharger by an electronic control unit using an activation signal; and generating by the electrical supercharger at least one of an air flow and an overpressure in at least one of an intake system of an internal combustion engine and an exhaust system of the internal combustion engine;

wherein the electrical supercharger is actuated in a non-combustion operation of the internal combustion engine, and the electrical supercharger is actuated for one of a predetermined duration, until a predetermined overpressure is achieved, and until a predetermined air flow is achieved.

7. The method according to claim 6, wherein the electrical supercharger is actuated during a coastdown operation of a vehicle.

8. The method according to claim 6, wherein the predetermined duration is a function of at least one of an engine temperature, a catalytic converter temperature, and an exhaust system temperature.

9. The method according to claim 6, further comprising:

checking a measurement signal detection for reliable performance by checking at least one measurement signal variable of at least one sensor during actuation of the electrical supercharger, the at least one sensor configured to detect at least one of a temperature in a region of the intake system, a temperature in a region of the exhaust system, the air flow in the intake system, and a pressure in the intake system.

10. The method according to claim 6, further comprising:
determining a reliable performance of the electrical supercharger from a sensor signal from a sensor connected to at least one of the intake system and the exhaust system one of before the supercharger is actuated and after the supercharger is actuated.

11. A method of operating an electrical supercharger, comprising:
actuating the electrical supercharger by an electronic control unit using an activation signal;
generating by the electrical supercharger at least one of an air flow and an overpressure in at least one of an intake system of an internal combustion engine and an exhaust system of the internal combustion engine; and
moving the internal combustion engine via an electrical machine connected to a crankshaft into a preselected position having a predetermined valve overlap after the internal combustion engine has been shut down;
wherein the electrical supercharger is actuated in a non-combustion operation of the internal combustion engine.

12. The method according to claim 11, further comprising:
checking a measurement signal detection for reliable performance by checking at least one measurement signal variable of at least one sensor during actuation of the electrical supercharger, the at least one sensor configured to detect at least one of a temperature in a region of the intake system, a temperature in a region of the exhaust system, the air flow in the intake system, and a pressure in the intake system.

13. The method according to claim 11, further comprising:
determining a reliable performance of the electrical supercharger from a sensor signal from a sensor connected to at least one of the intake system and the exhaust system one of before the supercharger is actuated and after the supercharger is actuated.

14. A method of operating an electrical supercharger, comprising:
actuating the electrical supercharger by an electronic control unit using an activation signal;
generating by the electrical supercharger at least one of an air flow and an overpressure in at least one of an intake system of an internal combustion engine and an exhaust system of the internal combustion engine;
opening at least one valve of a fuel tank venting system during actuation of the electrical supercharger;
closing the at least one valve of the fuel tank venting system during actuation of the electrical supercharger; and
determining a tightness of the fuel tank venting system in accordance with a pressure drop in a region of at least one of the fuel tank system of the internal combustion engine and the intake system of the internal combustion engine;
wherein the electrical supercharger is actuated in a non-combustion operation of the internal combustion engine.

15. The method according to claim 14, further comprising:
checking a measurement signal detection for reliable performance by checking at least one measurement signal variable of at least one sensor during actuation of the electrical supercharger, the at least one sensor configured to detect at least one of a temperature in a region of the intake system, a temperature in a region of the exhaust system, the air flow in the intake system, and a pressure in the intake system.

16. The method according to claim 14, further comprising:
determining a reliable performance of the electrical supercharger from a sensor signal from a sensor connected to at least one of the intake system and the exhaust system one of before the supercharger is actuated and after the supercharger is actuated.

17. A method of operating an electrical supercharger, comprising:
actuating the electrical supercharger by an electronic control unit using an activation signal;
generating by the electrical supercharger at least one of an air flow and an overpressure in at least one of an intake system of an internal combustion engine and an exhaust system of the internal combustion engine; and
determining a reliable performance and a tightness of at least one valve connected to one of the intake system and the exhaust system in accordance with opening the at least one valve, closing the at least one valve, and monitoring at least one pressure in the intake system;
wherein the electrical supercharger is actuated in a non-combustion operation of the internal combustion engine.

18. The method according to claim 17, wherein the valve includes one of an electrically activatable intake valve and an electrically activatable exhaust valve.

19. The method according to claim 17, further comprising:
checking a measurement signal detection for reliable performance by checking at least one measurement signal variable of at least one sensor during actuation of the electrical supercharger, the at least one sensor configured to detect at least one of a temperature in a region of the intake system, a temperature in a region of the exhaust system, the air flow in the intake system, and a pressure in the intake system.

20. The method according to claim 17, further comprising:
determining a reliable performance of the electrical supercharger from a sensor signal from a sensor connected to at least one of the intake system and the exhaust system one of before the supercharger is actuated and after the supercharger is actuated.

21. A device for operating an electrical supercharger, comprising:
an electronic control arrangement to actuate the electrical supercharger using an activation signal, to control the electrical supercharger to generate at least one of an air flow and an overpressure in at least one of an intake system of an internal combustion engine and an exhaust system of the internal combustion engine, and to actuate the electrical supercharger in a non-combustion operation of the internal combustion engine after the internal combustion engine has been switched off.

* * * * *